United States Patent [19]

Kikuchi et al.

[11] 3,951,873

[45] Apr. 20, 1976

[54] CERAMIC DIELECTRIC COMPOSITION

[75] Inventors: Nobuaki Kikuchi; Tsunehiko Yoshioka; Kiyoshi Furukawa; Shinobu Fujiwara, all of Tokyo, Japan

[73] Assignee: TDK Electronics Company, Limited, Tokyo, Japan

[22] Filed: Aug. 2, 1974

[21] Appl. No.: 494,186

[30] Foreign Application Priority Data

Oct. 4, 1973  Japan.............................. 48-110988

[52] U.S. Cl............................... 252/520; 252/63.5; 252/519; 252/521; 106/73.31
[51] Int. Cl.² ................................................. H01B 1/08
[58] Field of Search .......... 252/520, 521, 519, 63.5; 106/73.31

[56] References Cited

UNITED STATES PATENTS

| | | | |
|---|---|---|---|
| 2,576,379 | 11/1951 | Woodcock et al............ | 106/73.31 X |
| 2,576,380 | 11/1951 | Woodcock et al............ | 106/73.31 X |
| 3,000,745 | 9/1961 | Cianchi........................ | 106/73.31 X |
| 3,256,499 | 6/1966 | Khouri et al................. | 252/520 X |
| 3,345,189 | 10/1967 | Fujiwara et al.............. | 106/73.31 |
| 3,499,772 | 3/1970 | Fujiwara et al.............. | 252/520 X |

Primary Examiner—Benjamin R. Padgett
Assistant Examiner—E. Suzanne Parr
Attorney, Agent, or Firm—Oblon, Fisher, Spivak, McClelland & Maier

[57] ABSTRACT

A ceramic dielectric composition which comprises 22.5–45.2 wt. % SrO, 8.3–20.6 wt. % CaO, 29.3–80.8 wt. % $TiO_2$, and 0.07–8.3 wt. % MgO as main components.

6 Claims, 4 Drawing Figures

FIG. I

CERAMIC DIELECTRIC COMPOSITION

BACKGROUND OF THE INVENTION

1. Field of the Invention

The present invention relates to a high dielectric ceramic composition having a highly balanced dielectric constant and Q value which imparts a high breakdown voltage and thus expands the range of operation comditions, insures stable operation, and imparts special effects such as dielectric temperature compensation wherein the temperature coefficients of usual electrical circuit elements can be compensated by the high dielectric constant. Accordingly, the invention relates to an optimally high dielectric ceramic composition.

2. Description of the Prior Art

Known ceramic compositions with dielectric constants of 10–500 and temperature coeffieients of +100~—5000 × $10^{-6}/°C$ include $BaTiO_3$, $SrTiO_3$, $CaTiO_3$, $MgTiO_3$, or $La_2O_3 \cdot TiO_2$, $MgO \cdot SiO_2$, $Bi_2O_3 \cdot 2TiO_2$, and the like. However, compositions with a balanced combination of high dielectric constant, low temperature coefficient, and high Q value have been difficult to obtain. In such compositions, the temperature coefficient increases with increasing dielectric constant. Therefore, when a low temperature coefficient is required, a decreased dielectric constant must be tolerated along with a deterioration of loss angle at high frequency. Accordingly, even if the temperature coefficient of conventional compositions for temperature compensation can be decreased, deteriorated dielectric constant and Q value can be expected in electronic circuit elements, whereby sufficient temperature compensation will not result.

A high dielectric ceramic composition for temperature compensation which has a low and controlled temperature coefficient, high electric constant and low loss angle at high frequency is the $CaO—TiO_2—SiO_2—SrO$ system. However, the dielectric constant of this composition is only 18.4–145 (MHz at 25°C), as compared with the dielectric constant of $CaTiO_3—Sb_2O_3 \cdot 2MgO—SrO \cdot Nb_2O_3$ system which is 64–144. A practical temperature compensation requires a high dielectric constant. In order to improve the safety range for the conditions of operation, an increased breakdown voltage is also essential. However, no ceramic which can impart 20 KV/mm of AC breakdown voltage per 1 mm is known. The $CaTiO_3—Sb_2O_3 \cdot 2MgO—SrO \cdot Nb_2O_3$ system imparts a maximum AC breakdown voltage of only 10 KV/mm, which is similar to values for conventional compositions.

Temperature coefficients of various electronic circuit elements for temperature compensation are positive and relatively high. Accordingly, a practical temperature compensation effect cannot be expected with a ceramic composition for temperature compensation which has a negative and low temperature coefficient. For example, ferrite is usually used as the magnetic core for an I.F.T. circuit which is indispensable in a color T.V. The temperature coefficient of ferrite is in the range of +500~+2000 × $10^{-6}°C$. Accordingly, a negative temperature coefficient is necessary for temperature compensation of practical circuit elements and also to give balanced high characteristics. In a resonance circuit having $$f_o = \frac{1}{2\pi \sqrt{LC}}$$

wherein $L$ designates a positive temperature coefficient, sufficient temperature compensation $C$ must be imparted to obtain excellent reliability.

A need exists therefore, for a composition which will increase breakdown voltage while maintaining high dielectric constant and temperature compensation effects.

SUMMARY OF THE INVENTION

Accordingly, one object of the present invention is to provide a high dielectric ceramic composition for temperature compensation which imparts an excellent temperature compensation effect.

This object and other objects of the invention as will hereinafter become more readily understood can be obtained by a strontium titanate-calcium titanate-magnesium titanate high dielectric ceramic composition which comprises as major components: 22.5–45.2 wt% SrO; 8.3–20.6 wt. % CaO; 29.3–80.8 wt % $TiO_2$; and 0.07–8.3 wt. % MgO. As minor components, at lease one oxide of Mn, Cr, Sb, Fe, Ni, Co or at least one oxide of a rare earth metal, e. g. Ce, La, or the like, or clay are preferably added to the composition.

BRIEF DESCRIPTION OF THE DRAWING

A more complete appreciation of the invention and many of the attendant advantages thereof will be readily attained as the same becomes better understood by reference to the following detailed description when considered in connection with the accompanying drawings, wherein.

DETAILED DESCRIPTION OF THE PREFERRED EMBODIMENTS

Figure 1:
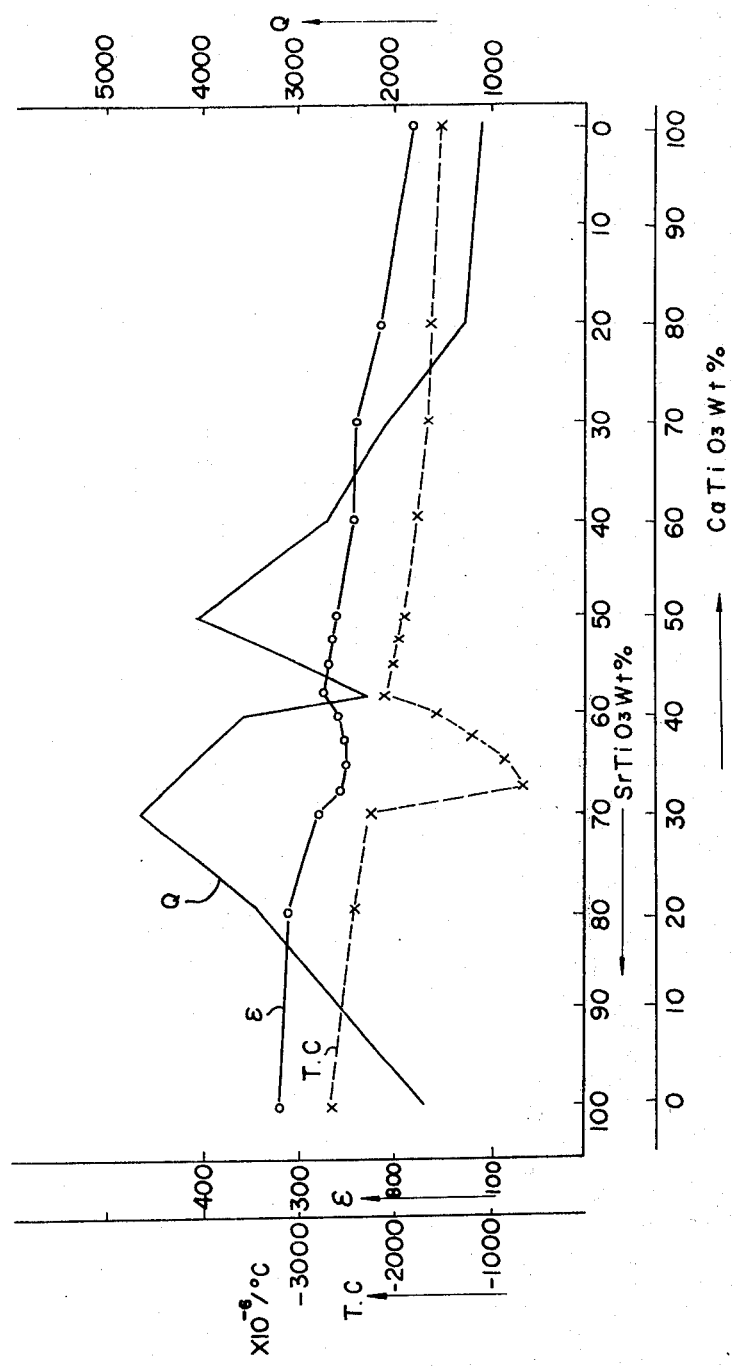
FIG. 1 is a graph of the relationship between various physical characteristics and the ratio of components in the basic strontium titanate-calcium titanate ceramic composition.

Suitable amounts of the minor components are less than 1 wt. %, preferably 0.05–0.5 wt. %, of the total components of the composition. As is shown in FIG. 1, the strontium titanate-calcium titanate ceramic compositions of the invention exhibit various Q values, dielectric constants $\epsilon$ and temperature coefficients, T.C. thereof, depending upon the ratio of the components in the compositions. The Q values ordinarily range from 1000–3000, and up to as high as 4700. The temperature coefficient T.C. ( × $10^{-6}/°C$) ordinarily ranges from −2500~−1500, to a minimum of −500.

Strontium titanate-calcium titanate compositions, which have various characteristics depending upon the amounts of components, have been studied. When $Bi_2O_3 \cdot 2TiO_2$ is used as the minor component, the Q value and T.C. will decrease even though $\epsilon$ will increase. Accordingly, the temperature coefficient is improved, but the inherent dielectric coefficient and Q value are obliged to decrease, whereby various inherent characteristics of the strontium-titanate-calcium titanate type composition cannot be effectively utilized, and only one characteristic, improved T.C., can be utilized.

Figure 2:
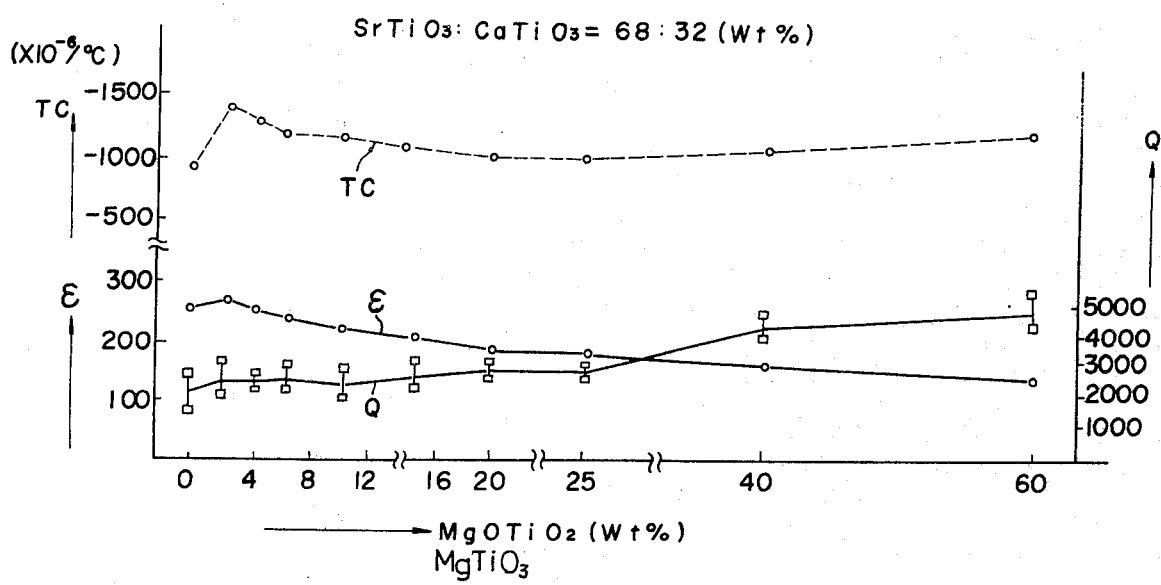
FIG. 2 is a graph of the change of physical characteristics when magnesium titanate is added to a strontium titanate-calcium titanate (68:32) ceramic composition.

As shown in FIG. 2, magnesium titanate as a third component controls the change of dielectric constant and Q value so as to allow effective use of the inherent characteristics of the composition and also to allow simple change in the temperature coefficient. Therefore, it is possible to decide upon the particular combination of characteristics and temperature coefficient required for a desirable temperature compensation in the range of simple change in temperature coefficient, which is stable for each composition.

The effect of inhibiting various changes of the characteristics is shown in Table 1. The combination of desirable characteristics can be effectively used industrially. Thus, the temperature coefficient of the dielectric constant ($\times 10^{-6}/°C$) changes smoothly around $-1000$, whereby an optimum temperature coefficient for temperature compensation can be easily obtained. On the other hand, the dielectric constant is 200–260, which is significantly higher than in conventional compositions and the Q value is about 2000–4000, whereby a combination of excellent characteristics is obtained.

Figure 3:
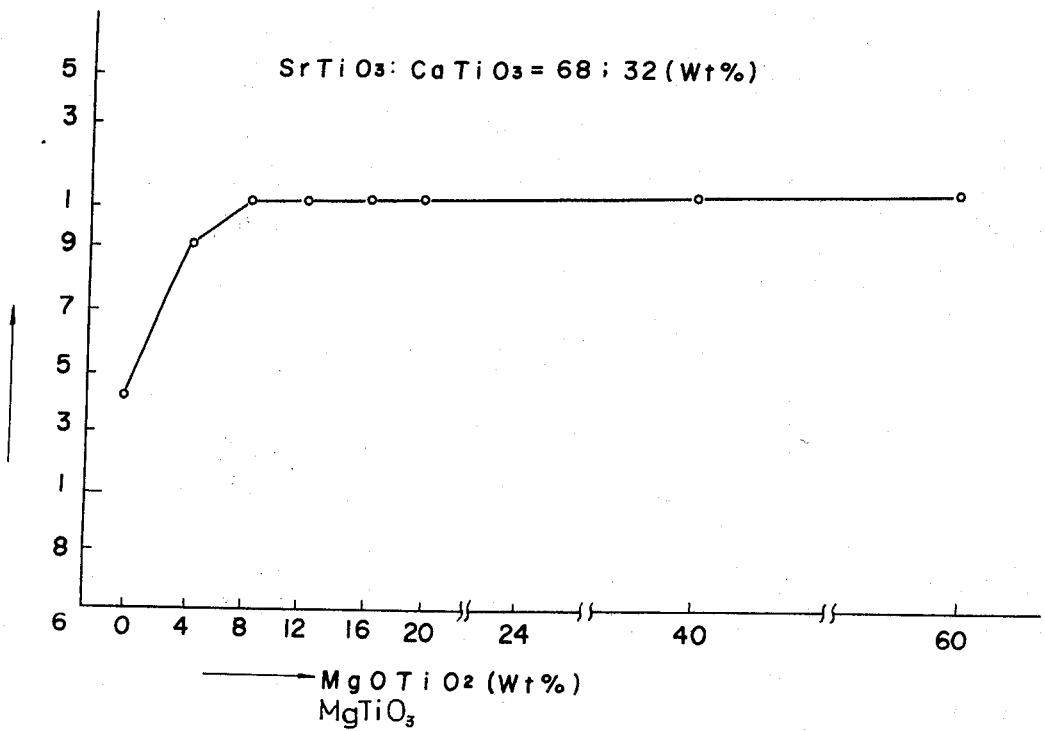
FIG. 3 is a graph of the change of the insulation resistance I.R. when magnesium titanate is added to strontium titanate-calcium titanate.

The remarkable industrial advantage of the effect of magnesium titanate component is the increased insulation resistance I.R., and the insulation breakdown voltage E$b$, of the ceramic composition. As shown in FIG. 3, the insulation resistance is relatively slowly increased to about $10 \times 10^{11}106$ which is much higher than $0.8 \times 10^{11}\Omega$ value of the insulation resistance of conventional strontium titanate-calcium-titanate ceramic compositions.

Figure 4:
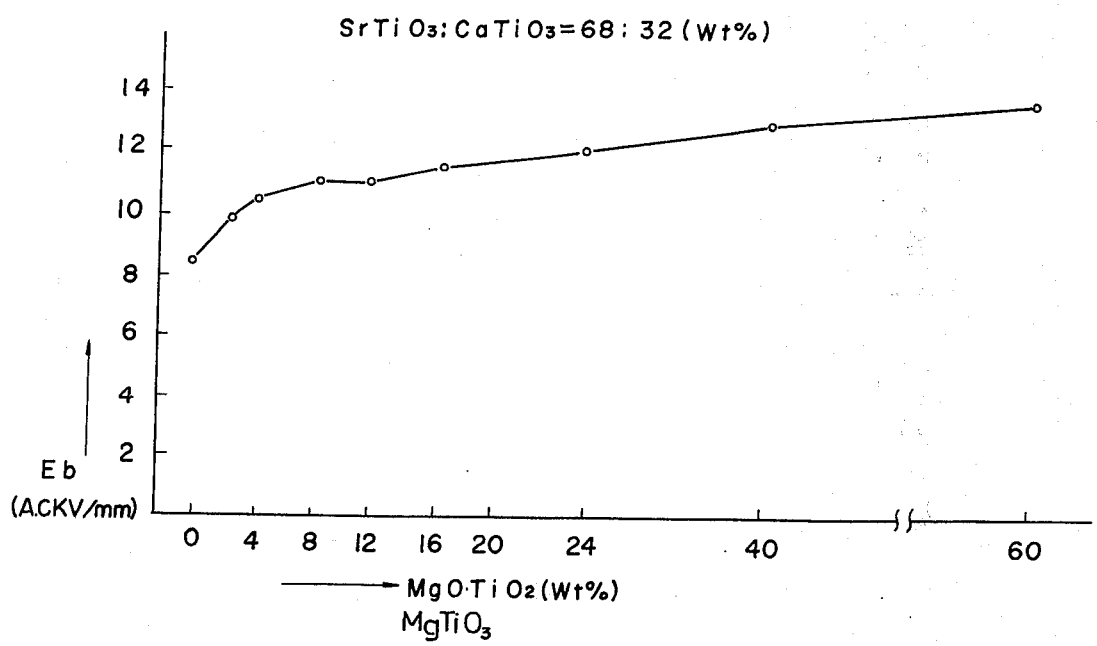
FIG. 4 is a graph of the change of breakdown voltage E$b$ when magnesium titanate is added to strontium titanate-calcium titanate.

One embodiment of the improved effect on the insulation breakdown voltage is shown in FIG. 4. The composition offers the significant advantage of accomplishing total improved effects as well as imparting an unexpected AC breakdown voltage of higher than 10 KV/mm without deteriorating the inherent characteristic of the strontium titanate-calcium titanate composition. The breakdown voltage E$b$ is a very important characteristic when the ceramic composition is to be used in a thin shape. When the composition is used in a thinly shaped form, stability and high reliability are provided because insulation breakdown difficulties are prevented because of the above excellent characteristics.

The effect of the magnesium titanate is especially remarkable when strontium titanate ranges from 50–70 wt. % and calcium titanate ranges from 30–50 wt. %. The combination of characteristics obtained is unexpectedly higher than in conventional compositions, and establishes a technical basis for widely using the inherent characteristics of the strontium titanate-calcium titanate composition industrially.

As is clear from the results of the following examples, when the strontium titanate content is higher than 80 wt. %, the temperature coefficient will be high, the Q value low and the sintering hard. On the contrary, when the strontium titanate component is less than 40 wt. %, the Q value will be low. When the calcium titanate content is higher than 60 wt. %, the temperature coefficient will be high and the Q value low. When the calcium titanate content is less than 20 wt. %, the Q value will be low and the sintering hard. When the magnesium titanate content is higher than 25 wt. %, the $\epsilon$ will be low and the temperature coefficient high. On the contrary, when the magnesium titanium content is less than 0.2 wt. %, the insulation resistance and insulation breakdown voltage will deteriorate. These disadvantages can be improved by employing 0.2–25 wt. % of magnesium titanate.

Suitable amounts of the main components of the dielectric ceramic composition are 22.5–45.2 wt. % SrO, 8.3–20.6 wt. % CaO, 29.3–80.8 wt. % TiO$_2$, and 0.07–8.3 wt. % MgO, and preferably 25–35 wt. % SrO, 9–15 wt. % CaO, 40–70 wt. % TiO$_2$ and 5–7.5 wt. %, MgO, and most preferably 30.71 wt. % SrO, 10.56 wt. % CaO, 52.02 wt. % TiO$_2$ and 6.71 wt. % MgO. With the composition of the invention, excellent characteristics can be imparted and excellent loss angle at high frequency can be obtained. The dielectric tangent is very small, the temperature coefficient is stable and the composition is economical and is suitable for industrial mass production. As stated above, a high dielectric ceramic composition for temperature compensation having a high dielectric constant, low temperature coefficient and high Q value may be obtained by combining three components: strontium titanate, calcium titanate and magnesium titanate in a suitable range.

Oxides of Mn, Cr, Sb, Fe, Ni, Co or at least one oxide of a rare earth metal or clay can also be added to the dielectric ceramic composition of this invention in the range of 0.05 to 0.5 wt. %.

Having generally described the invention, a more complete understanding can be obtained by reference to certain specific examples, which are included for purposes of illustration only and are not intended to be limiting unless otherwise specified.

EXAMPLE 1

The components shown in Tables 1 and 2 were blended. Commercially available industrial raw materials, SrCO$_3$, CaCo$_3$, TiO$_2$ and MgCO$_3$, were used to prepare the components. The mixture of components was mixed in a wet form for 20 hours in a porcelain pot mill and the mixture was calcined at 1100°–1250°C for 2 hours to produce SrTiO$_3$, CaTiO$_3$ and MgTiO$_3$. The calcined product was rough crushed and then crushed in wet form for 20 hours in the pot mill. The product was separated from the water and dried. A disk having a diameter of 16.5 mm and thickness of 0.6 mm was prepared by molding a mixture of the product and a binder under a pressure of about 3 t/cm$^2$. The disk was sintered at 1280°–1380°C for 2 hours. On the resulting ceramic disk, a silver electrode was printed and bonded, a lead wire was soldered onto the silver electrode, and the disk was washed. Various electrical characteristics of the composition containing various ratios of components were measured. The results are shown in Table 1.

The Q meter (4340A) and IR meter (4329A) were manufactured by YEW and were used at 20°C in the tests. The temperature coefficients were measured with a model 74D capacitance bridge manufactured by Boontone Electronics Corporation (U.S.A.) and a thermostated constant temperature bath (BT-100) manufactured by Electropto Works (Japan), model EWC-102. In the mixing step, about 0.2 wt. % of MnO$_2$ was added as an oxidizing agent to prevent reduction during sintering. Additives such as CeO$_2$, La$_2$O$_3$ or clay can be added as mineralizing agents to improve the sintering ability of the composition. Improved effects were thereby noted. The characteristics of various compositions prepared under the conditions of the invention are shown in Table 1, wherein percentages of each component of the composition, strontium titanate, calcium titanate and magnesium titanate are shown at the left side, and the dielectric constant $\epsilon$, Q value, temperature coefficient of the dielectric constant T.C. ($\times 10^{-6}/°C$), insulation resistance ($\times 10^{11}\Omega$), A.C. insulation breakdown voltage (KV/mm) and loss angle Q are shown at the right. The weight percentages of SrO, CaO, MgO and TiO$_2$ of the compositions are also stated in Table 2.

The characteristics of compositions containing one or more oxides of Mn, Cr, Sb, Fe, Ni or Co or oxides of rare earth metals e.g. Ce, La or clay, are shown in Table 3. The weight percentages of SrO, CaO, MgO and TiO$_2$ of the compositions of Table 3 are shown in Table 4. These are listed to show the improved sintering ability and other industrial advantages by adding the subcomponents.

Table 1

| Sample | SrTiO$_3$ | CaTiO$_3$ | MgTiO$_3$ | $\epsilon$ | Q | T.C. ($\times 10^{-6}/°C$) | I.R. ($\times 10^{11}\Omega$) | Eb (A.C. KV/mm) |
|---|---|---|---|---|---|---|---|---|
| 1 | 100 | 0 | 0 | 320 | 2000 | −2700 | 3 | 8.0 |
| 2 | 80 | 20 | 0 | 313 | 3700 | −2475 | 1 | 7.0 |
| 3 | 70 | 30 | 0 | 282 | 4700 | −2247 | 2 | 8.0 |
| 4 | 60 | 40 | 0 | 296 | 4000 | −1543 | 7 | 8.4 |
| 5 | 50 | 50 | 0 | 264 | 4400 | −1932 | 5 | 9.0 |
| 6 | 40 | 60 | 0 | 243 | 2750 | −1790 | 10 | 9.2 |
| 7 | 30 | 70 | 0 | 237 | 2200 | −1653 | 10 | 8.2 |
| 8 | 20 | 80 | 0 | 209 | 2300 | −1601 | 10 | 11.0 |
| 9 | 0 | 100 | 0 | 180 | 2100 | −1503 | 5 | 8.0 |
| 10 | 68 | 32 | 0 | 260 | 2800 | −875 | 2 | 9.6 |
| 11 | 66 | 32 | 2 | 260 | 3000 | −1350 | 10 | 9.8 |
| 12 | 66 | 30 | 4 | 250 | 2900 | −1300 | 10 | 11.5 |
| 13 | 64 | 30 | 6 | 235 | 2800 | −1250 | 10 | 12.0 |
| 14 | 62 | 29 | 9 | 220 | 3200 | −1150 | 10 | 11.8 |
| 15 | 59 | 28 | 13 | 200 | 3600 | −1080 | 10 | 11.8 |
| 16 | 57 | 25 | 18 | 180 | 3800 | −1000 | 10 | 12.4 |
| 17 | 54 | 26 | 20 | 175 | 4500 | −910 | 10 | 12.1 |
| 18 | 49 | 24 | 27 | 148 | 4800 | −1115 | 10 | 13.8 |
| 19 | 43 | 20 | 37 | 117 | 5200 | −1195 | 10 | 14.0 |

Table 2

| Sample | SrO (wt.%) | CaO (wt.%) | MgO (wt.%) | TiO$_2$ (wt.%) |
|---|---|---|---|---|
| 1 | 56.46 | — | — | 43.54 |
| 2 | 45.17 | 8.25 | — | 46.58 |
| 3 | 39.52 | 12.38 | — | 48.10 |
| 4 | 33.88 | 16.50 | — | 49.62 |
| 5 | 28.23 | 20.63 | — | 51.14 |
| 6 | 22.58 | 24.75 | — | 52.67 |
| 7 | 16.94 | 30.48 | — | 52.58 |
| 8 | 11.29 | 33.00 | — | 55.71 |
| 9 | — | 41.25 | — | 58.75 |
| 10 | 38.39 | 13.20 | — | 48.41 |
| 11 | 37.26 | 13.20 | 0.67 | 48.87 |
| 12 | 37.26 | 12.38 | 1.34 | 49.02 |
| 13 | 36.13 | 12.38 | 2.01 | 49.48 |
| 14 | 35.01 | 11.96 | 3.02 | 50.01 |
| 15 | 33.31 | 11.55 | 4.36 | 50.78 |
| 16 | 32.18 | 10.31 | 6.04 | 51.47 |
| 17 | 30.49 | 10.73 | 6.71 | 52.07 |
| 18 | 27.67 | 9.9 | 9.05 | 53.38 |
| 19 | 24.28 | 8.25 | 12.41 | 55.06 |

Table 3

| SrTiO$_3$ (wt.%) | CaTiO$_3$ (wt.%) | MgTiO$_3$ (wt.%) | sub component | amount (wt.%) | $\epsilon$ | Q | I.R. ($\times 10^{11}\Omega$) | T.C. ($\times 10^{-6}/°C$) | Eb (A.C. KV/mm) |
|---|---|---|---|---|---|---|---|---|---|
| 54.40 | 25.60 | 20.0 | Mn | 0.2 | 180 | 6200 | 10 | −890 | 12.8 |
| 54.40 | 25.60 | 20.0 | Cr$_2$O$_3$ | 0.2 | 175 | 4800 | 10 | −880 | 11.8 |
| 54.40 | 25.60 | 20.0 | Sb$_2$O$_3$ | 0.2 | 186 | 5100 | 10 | −920 | 12.2 |
| 54.40 | 25.60 | 20.0 | Nb$_2$O$_5$ | 0.2 | 196 | 3900 | 10 | −960 | 12.0 |
| 54.40 | 25.60 | 20.0 | Ce$_2$O$_3$ | 0.2 | 182 | 4200 | 10 | −860 | 12.5 |
| 54.40 | 25.60 | 20.0 | La$_2$O$_3$ | 0.2 | 177 | 3700 | 10 | −910 | 12.6 |
| 54.40 | 25.60 | 20.0 | None | | 183 | 4600 | 9.0 | −850 | 19.0 |

Table 4

| SrO | CaO | MgO | TiO$_2$ |
|---|---|---|---|
| 30.71 wt.% | 10.51 wt.% | 6.71 wt.% | 52.02 wt.% |

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A dielectric ceramic composition, which comprises 22.5–45.2 wt.% SrO, 8.3–20.6 wt.% CaO, 29.3–80.8 wt.% TiO$_2$, and 0.07–8.3 wt.% MgO.

2. The dielectric ceramic composition of claim 1, which further comprises 0.05–0.5 wt.% of a sub-component of at least one oxide of Mn, Cr, Sb, Fe, Ni, Co or at least one oxide of a rare earth metal or clay.

3. A dielectric ceramic composition which comprises 40–80 wt.% of strontium titanate, 20–60 wt.% of calcium titanate and 0.2–25 wt.% of magnesium titanate.

4. The dielectric ceramic composition of claim 3 which further comprises 0.05–0.5 wt.% of a sub-component of at least one oxide of Mn, Cr, Sb, Fe, Ni, Co or at least one oxide of a rare earth metal or clay.

5. The dielectric ceramic composition of claim 3, which comprises 50–70 wt. % strontium titanate, 30–50 wt. % calcium titanate, 0.2–25 wt. % magnesium titanate, 0.05–0.5 wt. % of a sub-component of at least one oxide of Mn, Cr, Sb, Fe, Ni, Co or at least one oxide of a rare earth metal or clay.

6. The dielectric ceramic composition of claim 3, wherein the starting materials are $SrCO_3$, $CaCO_3$, $TiO_2$ and $MgCO_3$ which are sintered to form said ceramic composition.

* * * * *